Dec. 25, 1951  A. W. VETTEL  2,579,886
PROCESS OF MAKING PEBBLE-SHAPED MAGNESIA REFRACTORY
Filed Oct. 7, 1948
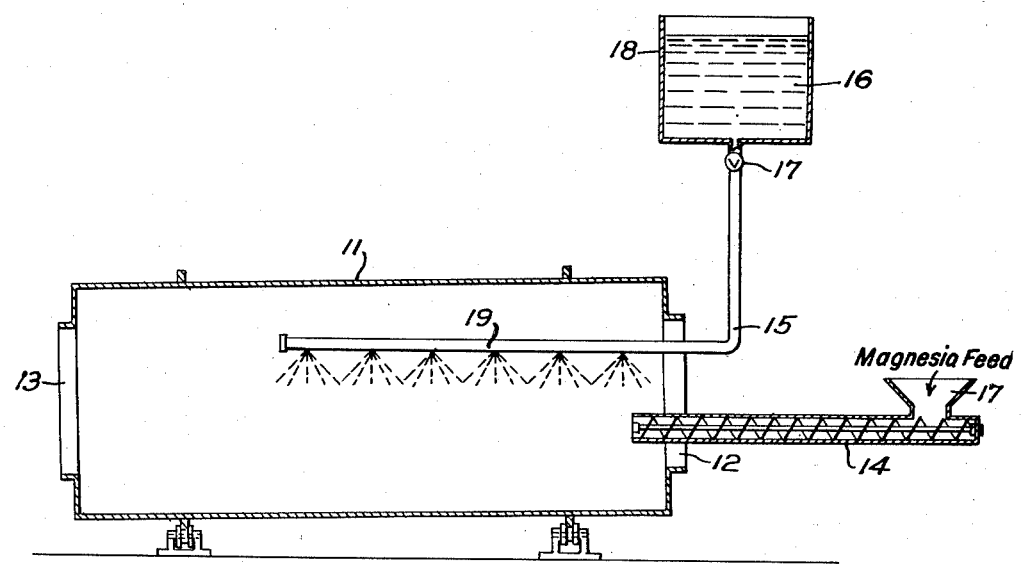
INVENTOR.
ARTHUR W. VETTEL
BY James E. Toomey

UNITED STATES PATENT OFFICE 2,579,886

PROCESS OF MAKING PEBBLE-SHAPED MAGNESIA REFRACTORY

Arthur W. Vettel, Watsonville, Calif., assignor, by mesne assignments, to Kaiser Aluminum & Chemical Corporation, a corporation of Delaware Application October 7, 1948, Serial No. 53,179

11 Claims. (Cl. 23—201)

This invention relates to magnesia shaped articles and to processes of preparing the same, and it relates especially to shaped articles of high-purity magnesia.

Magnesia, or magnesium oxide, is a highly refractory material and it is desirable for use as such in installations where high temperatures are maintained, especially for considerable lengths of time. A particular installation where a highly refractory material is desired is a thermal regenerator such as described in Reissue 19,757, to Royster, U. S. 2,422,081, to F. G. Cottrell, and U. S. 2,421,744, to F. Daniels et al., which device is of great efficiency in attaining and maintaining very high temperatures. One of the elements of such a device is a pebble bed, which is a heat-exchange bed made up of relatively small refractory shapes, i. e. of 2-inch diameter or less. In the operation of the "pebble stove," the pebble bed usually serves to take up heat in one operational step and to give up heat in the next succeeding operational step. For instance, in nitrogen-fixation a mixture of nitrogen and air or oxygen is introduced into a bed of heated pebbles and the gas mixture is thereby heated to reaction temperature with formation of nitric oxide. The hot gases pass to a second pebble bed where they give up their heat, raising the bed temperature to the desired point, whereupon the flow, or cycle, is reversed. A temperature of over 3600° F. (1982° C.) is required in order to effect this reaction. In addition to the nitrogen-fixation process, the pebble stove is also proposed as useful in superheating steam, for instance, in a process for total gasification of coal. The latter operation also requires temperatures of 3000° F. or over and, depending upon suitable refractories available for the pebble bed, even higher temperatures are desirable.

Not only is refractoriness, or ability to withstand the high temperatures noted without fusion or cracking or spalling, a necessary characteristic of the pebble bed, but it is also essential for satisfactory operation that the bed provide a substantial amount of voids and that the pebbles present a large surface area per cubic foot of volume of the bed, in order to effect efficient heat interchange. It has long been recognized that these relationships are most ideally exhibited by pebbles which are spheroidal, or rounded, shapes. Such shapes assure good contact between the pebbles and the gas to be heated or cooled, enable even and regular flow of gas, and prevent the formation of channels or irregular gaps in the bed. However, the dense refractories which have been heretofore available in such shapes, cheaply and in quantity, have been the naturally-occurring gravels, which are rock fragments rounded by the long-continued action of natural forces. Gravels are not highly refractory, because of their conglomerate composition and content of lower-melting compounds, and for this reason are not suitable in the higher-temperature applications. These gravels, or other refractory particles containing lower-melting compounds, for instance as bonding agents, deform or spall under the strains imposed by the weight of the bed and by the alternate heating and cooling steps. In order to increase the field of application of the thermal regenerators of this type, it is desired to develop a supply of pebbles of suitable size and shape and of high refractoriness; and, furthermore, these pebbles or nodules must be able to withstand increasingly severe high temperature conditions without cracking or spalling or the production of fines. It has also been desired to get high heat capacity in a small volume by employing a bed of very dense pebbles, having correspondingly high heat capacity.

It has now been found according to the present invention that magnesia pebbles of high refractoriness and substantially spheroidal shape are made by nodulizing finely divided hard-burned magnesia, containing at least 95% of magnesium oxide and not over 1.5% of silica, while spraying with a liquid binder, and firing the pebbles or nodules so formed. A magnesia-yielding material, that is, a substance which is converted to magnesia upon firing, is calcined at such temperature and for such time as will produce a hard-burned magnesia to obtain the starting material.

The magnesia-yielding material can be magnesium hydroxide, brucite, magnesite, magnesium carbonate, magnesium basic carbonate or other magnesia-yielding material. It is especially desirable to calcine such material to an ignition loss of not over about 0.75%. Preferably the ignition loss is from about 0.1% to about 0.75%. An especially good source of magnesia is precipitated magnesium hydroxide or carbonate, such as, for instance, $Mg(OH)_2$ precipitated from seawater by treatment thereof with calcined dolomite, lime or other alkali. The magnesia so obtained is in the form of crystals of relatively uniform size and shape, and of especially high purity. This is especially advantageous in "snow-balling" of the crystals into the nodule form, because they pack together well, due to their regularity, and they bind well because of their high purity, particularly when employing a binder such as magnesium chloride or magnesium sulfate solution. It is advantageous to grind the calcined magnesia until about 90% of it passes through a screen having 200 meshes per linear inch, corresponding to 74 microns diameter. In this manner, crystal aggregates are broken down, and the magnesia appears to pack together better in the method of this invention.

The accompanying drawing shows schematically an apparatus which is especially suitable for carrying out the nodulizing step of the present process. The drawing shows a nodulizing drum of conventional type having a cylindrical shell 11 closed at both ends, but having aperture 12 at one end through which the hard-burned magnesia is fed into the drum, conveniently by way of screw conveyor 14 actuated by and desired means (not shown), and through which also enters pipe or conduit 15 for introduction of liquid binding agent, and having aperture 13 on the opposite end of the drum through which the formed nodules are withdrawn in any convenient manner. The liquid binder 16 is suitably stored or held in a convenient receptacle 18 and flows from 18 through pipe 15 to spraying apertures 19 through which it is sprayed onto the magnesia in the drum. Flow of binding liquid through pipe 15 is controlled by any desired valve 17. Sometimes it is desirable to scrape the material from the drum as it rotates and this can be effected by disposing in the drum above its longitudinal axis a reciprocating arm carrying suitable knives adapted to scrape the moistened material off, permitting it to drop or tumble back to the bottom portion of the drum. The nodulizer is mounted and actuated in the known manner. The nodules which are drawn off through aperture 13 can be cured, that is, allowed to dry and harden, by standing in air or the curing process can be accelerated by autoclaving, or by drying in a stream of heated air, and after curing the nodules can be fired. In another variation, the nodules can be fired directly without the curing step, but it is preferable to cure and then fire. The method of nodulizing is described more fully below.

A number of liquids can be employed to bind the nodules, being preferably added as sprays during the nodulizing operation. Such binders can include, for example, water, molasses (preferably thinned with water), or water solution of magnesium chloride or of magnesium sulfate or of a mixture of the two salts, or any desired mixture of suitable liquid binders. The employment of the magnesium chloride and/or magnesium sulfate solution is particularly advantageous because it readily forms a Sorel cement with some of the fine magnesia and gives a strong chemically-bonded nodule which withstands abrasion and cracking during handling and firing. A useful binder liquid is seawater which has been treated to remove bicarbonates and carbon dioxide. Preferably, the binder liquid contains from about 4 to about 14 grams per liter of magnesium chloride or an equivalent amount of magnesium sulfate or of both salts. Excellent results have been obtained when employing a liquid binding medium containing from 6 to 8 grams per liter of magnesium chloride. However, somewhat lower concentrations are also useful, and good results have been obtained by spraying with spent seawater which has been treated to precipitate $Mg(OH)_2$ therefrom and which still contains about 10% to 20% of its original magnesium ion content. But in order to make nodules for use in the higher ranges of temperature and under more severe operating conditions, the binder should contain the higher amounts of magnesium salt as described above.

The magnesia employed, although hard-burned, has considerable activity, especially toward the bonding agents, and it is believed that this is due to the lack of a continuous matrix or film of impurities, especially of silicate impurities, on the faces of the crystals. The crystals have, furthermore, fairly straight sides and the faces meet at sharp and well-defined vertices which favors inter-fitting and close packing during the nodulizing step. Although magnesia of such low ignition loss and of such fairly complete crystallization has hitherto not been considered an "active" material, it is believed that the high MgO content and low silica content of the material having the characteristics here described enables bonding of the crystals due to the lack of silicate or other film and the promotion of crystal-to-crystal contact. In other words, it is believed that inter-crystalline forces may be permitted to act, in the absence of the interfering films present in the heterogeneous structures of the prior art. Whatever the mechanism of the operation may be, it is possible by the present process to make rounded, or approximately spheroidal, shapes of magnesia refractory which withstand high temperatures and provide an efficient packing material for a heat-exchange, gas-traversable bed. Nodules made according to this invention withstand temperatures of around 4000° F. for long periods without cracking or the production of fines which would unfavorably affect the efficiency of the bed of refractory material. The fines are undesirable because they tend either to settle in interstitial shapes and impede the gas flow, or to be carried along with the gas, which is likewise objectionable.

As an example of the method of carrying out this invention, magnesium hydroxide, which has been obtained by treating ocean water with calcined dolomite to precipitate about 85% of the available magnesium ion, washing the precipitated magnesium hydroxide and filtering, is calcined to an ignition loss of 0.73%. The calcination is carried out in a rotary kiln. The magnesia so obtained analyzes as follows: 1.33% $SiO_2$, 0.26% $Fe_2O_3$, 0.22% $Al_2O_3$, 1.04% CaO, 0.73 ignition loss, the remainder MgO. The calcined product is ground in a ball mill until 97% passes through a 200-mesh screen, and the ground product is fed through screw conveyor 14 into the revolving drum of the nodulizing device described above. It is there sprayed with a liquid binder, which is de-carbonated seat water with added $MgCl_2.6H_2O$, and which contains about 6 to 8 g./l. of $MgCl_2$. The nodules which are withdrawn from the nodulizer through aperture 13 vary from about ⅜ inch to 1 inch in average diameter. They are allow to stand in air for about 4 hours to cure. The cured nodules have an ignition loss, in this instance, of 9.45% upon calcination for 1 hour at 1000° C. The hard, chemically bonded nodules are now placed in a stack kiln and fired at a temperature a little above 2000° C. In this example, the temperature is increased from room temperature to the firing temperature rather slowly, through a period of about 8 hours, is held at the firing temperature for about an hour, and is then reduced to about 100° C. in a period of about 4 hours. The nodules so prepared are very dense and hard. Of two samples of this lot tested, sample A has a density of 3.08 grams per cc., and sample B, a density of 3.14 grams per cc. When they are examined for porosity by the mercury displacement method, sample A exhibits a porosity of 15.4% by volume, and sample B, of 12.7% by volume.

In variations of the process, the binding spray liquid can advantageously be a water solution of magnesium chloride containing from about 4 to about 14 parts of $MgCl_2.6H_2O$ per 1000 parts of water. Magnesium sulfate can be employed instead of, or in addition to, or partially to substitute for, the $MgCl_2$. The binding solutions which form Sorel cement with at least part of the magnesia employed are preferred, because when the nodules are fired they retain greater strength through the intermediate firing range, that is, at from 500° to 700° C., and therefore firing losses due to fines and breakdown are reduced. The magnesium oxysalt also is believed to aid in recrystallization in the bonding during firing.

Instead of calcining precipitated magnesium hydroxide, another advantageous magnesia can also be obtained by calcining precipitated magnesium carbonate or magnesium basic carbonate. Other sources of magnesia as described above can also be used, but the silica content should be not over 1.5% and the magnesium oxide content should be at least 95.0%, although any content of magnesium oxide exceeding 95.0% is useful. Magnesia containing as high as between 98.0% and 99.0% of magnesium oxide has been employed in this method with very good results, and as high a magnesium oxide content as can be obtained in practice is desirable. It is desirable that the magnesia starting material be of such size that at least about 90% passes through a 100-mesh screen. Fines recovered from fired nodules or pebbles which have been made according to this invention can also be ground until about 90% passes 200-mesh and can then be admixed with the other starting magnesia described and formed into nodules as shown.

While in the above example the nodules were fired at a temperature above 2000° C., they can also be fired at a temperature as low as 1800° C. It is not essential that the nodules be fired immediately upon curing. When the nodules are chemically bonded and have good green strength they can be shipped to the site of use and can be fired in place in the pebble stove. In this case, the temperature of the nodules is preferably increased rather slowly and gradually to the firing temperature in order to prevent formation of fines or cracks.

It is an advantage of the present process that a rounded, spheroidal nodule is obtained which packs well into the pebble bed, providing excellent conditions for heat exchange, especially with respect to the relationship between volume and surface area and to the amount of voids. Also, the nodules are very dense and have, therefore, a high heat capacity. In this manner, the pebble bed has also a greatly increased heat capacity because a greater number of the nodules are packed into a given volume. It is another advantage of this invention that by nodulizing, the magnesia crystals pack together well into the desired shapes, and that there are avoided the laminations exhibited by shapes formed under pressures when the shaped articles are brought to the desired very high temperatures in use. The avoidance of laminations and cracks prevents any substantial access of dust or carbon particles into the inner portions of the nodules, which would result in a reducing reaction and further destructive effect upon the spheroid shapes. It is also an advantage of the present process that dense shapes are obtained without the necessity of employing carefully graded aggregates of various size ranges.

Nodules prepared according to this invention have been held in a heat-exchange bed at a temperature of 2300° C. (4172° F.) for a period of six weeks. At the end of this period, they were found to have remained of the desired size and shape and to have produced a minimum amount of fines, and showed a very small amount of cracks in the spheroids. The nodules can be employed in a stationary installation or they can be used as a moving, or movable, bed, because they do not deform nor fuse together at the high temperatures shown.

In the specification and claims, parts and percentages are by weight unless otherwise specified, except that porosity is expressed as percent by volume. In conformity with usual practice in reporting chemical analyses of refractory materials, the proportions of the various chemical constituents present in a material are given as though these constituents were present as the simple oxides. Thus, the magnesium constituent is referred to as magnesium oxide, or MgO, the silicon constituent as silica, or $SiO_2$, the iron constituent as iron oxide, or $Fe_2O_3$, although the silica or other constituent and a very small proportion of the MgO, for example, may be present in combination with each other or with another minor constituent. For example, the term "1.5% of $SiO_2$, or of silica" is intended to mean that a chemical analysis of the material referred to would show the silicon content as 1.5% expressed as $SiO_2$, although in fact all of the silicon might be present in the form of magnesium orthosilicate or in some other combined form. The term "magnesia-yielding material" or "magnesia-yielding compound" is intended to mean a material or compound which yields magnesia upon firing. Instead of a ball mill, any suitable grinding or pulverizing means can be employed.

What is claimed is:

1. Process of making pebble-shaped magnesia refractory comprising calcining magnesia-yielding material, containing on the ignited basis at least 95% magnesium oxide and not over 1.5% silica, to an ignition loss of not over about 0.75%, nodulizing said calcined material while spraying with a liquid binder, at least about 90% of said calcined material passing through a 100 mesh screen, and firing said nodules at a temperature of at least 1800° C.

2. Process of making pebble-shaped magnesia refractory comprising calcining magnesia-yielding material, containing on the ignited basis at least 95% magnesium oxide and not over 1.5% silica, to an ignition loss of from about 0.1% to about 0.75%, nodulizing said calcined material while spraying with a liquid binder, at least about 90% of said calcined material passing through a 100 mesh screen, curing said nodules, and firing said cured nodules at a temperature of at least 1800° C.

3. Process of making pebble-shaped magnesia refractory comprising calcining magnesia-yielding material, containing on the ignited basis at least 95% magnesium oxide and not over 1.5% silica, to an ignition loss of from 0.1% to 0.75%, grinding said calcined material until at least about 90% thereof passes through a 100 mesh screen, nodulizing said ground material while spraying with a liquid binder, curing said nodules, and firing said cured nodules at a temperature of at least 1800° C.

4. Process as in claim 3 wherein the magnesia yielding material is magnesium hydroxide precipitated from sea water by treatment thereof with calcined dolomite.

5. Process of making pebble-shaped magnesia refractory comprising calcining precipitated magnesia-yielding material, containing on the ignited basis at least 95% magnesium oxide and not over 1.5% silica, to an ignition loss of from about 0.1% to about 0.75%, grinding said calcined material until 90% thereof passes through a screen having 100 meshes to the linear inch, nodulizing said ground material while spraying with a liquid binder, curing said nodules, and firing said cured nodules at a temperature of at least 1800° C.

6. Process as in claim 5 wherein the liquid binder is a water solution containing from 4 to about 14 grams of magnesium chloride per liter.

7. Process as in claim 5 wherein the liquid binder is a solution of magnesium sulfate in water.

8. Process as in claim 5 wherein the liquid binder is a water solution containing from 6 to 8 grams of magnesium chloride per liter.

9. In a process for making pebble-shaped magnesia refractory adapted to withstand firing at a temperature of at least 1800° C. the steps which comprise calcining precipitated magnesia-yielding material, containing on an ignited basis not less than 95% magnesium oxide and not over 1.5% silica, to an ignition loss of from about 0.1% to about 0.75%, grinding said calcined material until at least about 90% thereof passes through a 100 mesh screen, and nodulizing said ground calcined material while spraying with a liquid binder.

10. Process for making a pebble-shaped magnesia refractory comprising calcining to an ignition loss of from about 0.1% to about 0.75% $Mg(OH)_2$ obtained by treating sea water with calcined dolomite and washing and filtering the precipitate so produced, grinding said calcined material until 97% thereof passes through a screen having 200 meshes to the linear inch, nodulizing said ground material while spraying with a water solution containing from 6 to 8 grams per liter of magnesium chloride, curing said nodulized material, and firing said nodulized material in a stack kiln at a temperature of at least 2000° C.

11. Process for making a pebble-shaped magnesia refractory which comprises calcining to an ignition loss of from about 0.1% to about 0.75% magnesium hydroxide, obtained by treating sea water with calcined dolomite and washing and filtering the precipitate so produced, grinding said calcined magnesia until at least 90% thereof passes through a screen having 100 meshes per linear inch, nodulizing said ground magnesia while spraying with sea water from which said magnesium hydroxide has been precipitated and which contains from 10% to 20% of its original magnesium ion content, curing said nodulized material, and firing said nodulized material in a stack kiln at a temperature of at least 2000° C.

ARTHUR W. VETTEL.

REFERENCES CITED

The following references are of record in the file of this patent:

UNITED STATES PATENTS

| Number | Name | Date |
| --- | --- | --- |
| 1,775,313 | Lellep | Sept. 9, 1930 |
| 2,335,374 | Woodward | Nov. 30, 1943 |
| 2,348,847 | Pike | May 16, 1944 |
| 2,354,584 | Elkington et al. | July 25, 1944 |
| 2,478,593 | Pike | Aug. 9, 1949 |